United States Patent [19]

Matumoto et al.

[11] Patent Number: 4,514,675
[45] Date of Patent: Apr. 30, 1985

[54] ELECTRONIC DAMPER FOR PULSE MOTOR

[75] Inventors: Hiroaki Matumoto; Hiroshi Sekiguchi, both of Tokyo, Japan

[73] Assignee: Kanars Data Corporation, Japan

[21] Appl. No.: 457,890

[22] Filed: Jan. 14, 1983

[51] Int. Cl.³ .............................................. H02K 29/04
[52] U.S. Cl. ..................................... 318/696; 318/685
[58] Field of Search ................................. 318/696, 685

[56] References Cited

FOREIGN PATENT DOCUMENTS 1555056 11/1968 France .

Primary Examiner—S. J. Witkowski
Assistant Examiner—Saul M. Bergmann
Attorney, Agent, or Firm—Darby & Darby

[57] ABSTRACT

This invention is concerned with an electronic damper for a pulse motor wherein at the time of oscillation or rotation of a rotor in a pulse motor of a 1-phase excitation method having at least one pair of windings wound up to generate electromotive forces with the opposite polarities, a switching element is actuated in synchronization with completion of pulse driving the pulse motor, said one pair of windings are connected through a capacitor and the rotor can be brought to a standstill immediately by neutralizing the electromotive forces led up to each winding.

7 Claims, 7 Drawing Figures

ELECTRONIC DAMPER FOR PULSE MOTOR

FIELD OF THE INVENTION

This invention relates to a damper for a pulse motor and in particular to an electronic damper for a pulse motor best-suited for devices requiring a high-speed action to the pulse motor.

BACKGROUND OF THE INVENTION

In general, a damper is provided on a pulse motor. This damper is provided to shift the pulse motor promptly to a stable position and to bring it to a standstill. For example, as shown in FIG. 1, when the pulse motor is turned by $\theta_0$ from some position and then brought to a standstill, it reaches $\theta_0$ after the time of $t_1$ and thereafter vibrates to converge into $\theta_0$ after the time of $t_2$. This vibration causes undesirable effects to the devices. For example, in a typewriter provided with a pulse motor printing cannot be made before the vibration decreases. That is, when typing is made during vibration the letter cannot be typed out clearly. In addition, in a disc unit, etc. the vibration adversely affects positioning of the head. Accordingly, various methods have been used as a damper until now. One method from among the methods is that a 2-phase simultaneous excitation method is used as a method for driving a pulse motor. Another method is that a capacitor is coupled all the time between windings of a pulse motor with a 1-phase excitation method to make effective use of charging and discharge currents at the time of interruption. Then, with use of the former method, the effect from the damper is obtained, but it becomes difficult to control an angle accurately in comparison with the damper in the 1-phase excitation method. While, in case of the latter method, it is applicable only to low-speed devices. Namely, excitation by discharge current cannot follow high-speed interruption. In particular, the effect of the damper becomes larger when the capacity of the capacitor is increased. Accordingly, it is difficult to apply the pulse motor to the device such as a typewriter which needs to be given an accurate angle for selection of a printing head and to come to a standstill immediately after selection of the next printing type at a high speed.

SUMMARY OF THE INVENTION

This invention was invited in view of such circumstances. Accordingly, an objective of the invention is to provide a damper that can immediately shift from the position of the rotor of some pulse motor to another position and bring the pulse motor to a standstill promptly. The other objective of the invention is to offer a damper that allows the pulse motor to shift at a high speed and to stop instantaneously and at the same time prevents the angle accuracy of the pulse motor from being reduced.

For these purposes, in the invention, a pulse motor with a 1-phase excitation method is employed and damper effects are produced at the time of stop of the pulse motor. Other objectives, operation effects and details of the invention are made clear through the following explanation about the preferred embodiments of the invention to be made with reference to the attached drawings.

DESCRIPTION OF THE PREFERRED EMBODIMENTS

Figure 1:
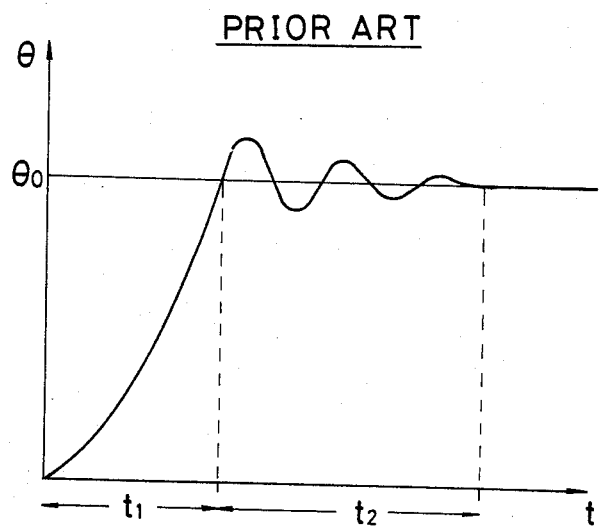
FIG. 1 is a graph showing a condition from occurrence of vibration in the conventional pulse motor to stop of it.

Explanation is made below on this invention by referring to the drawings. A typewriter is used in an example on account of the limited space for explanation, but the similar results are obtainable even when the invention is applied to other devices.

Figure 2:
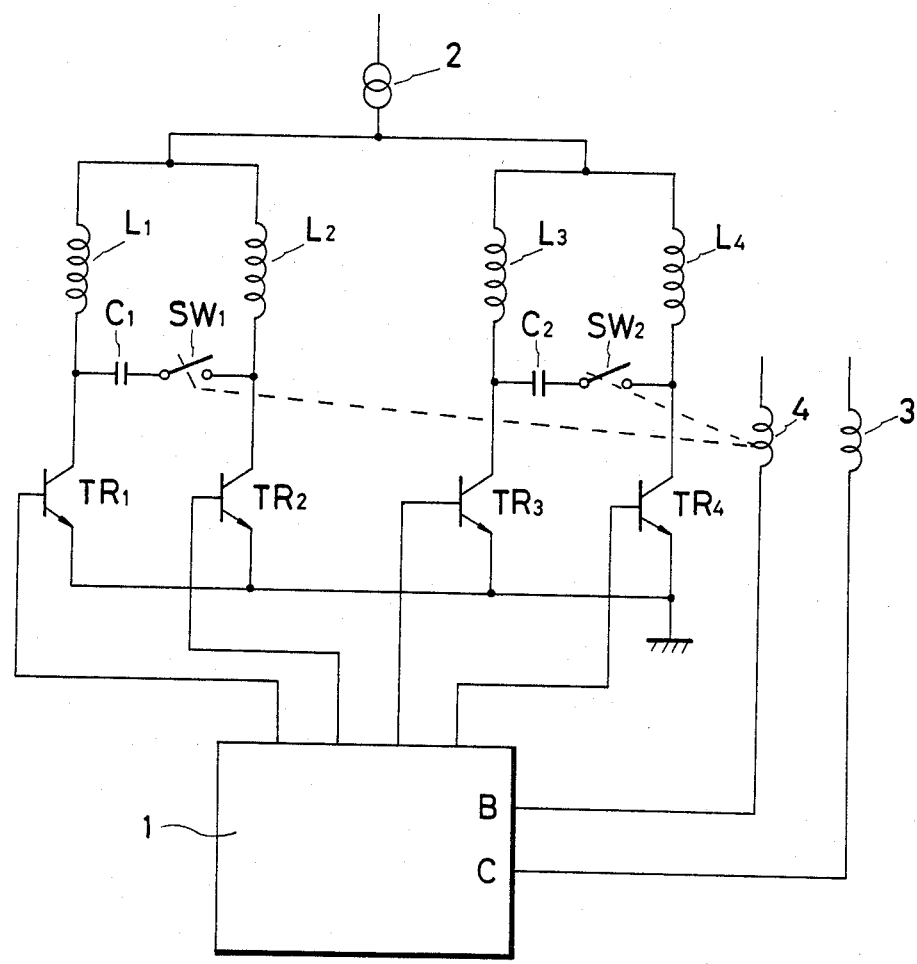
FIG. 2 is a circuit diagram showing an embodiment of the invention.

In FIG. 2, 1 represents a control circuit. This control circuit 1 has a function to send a typing timing pulse of a typing hammer (not shown) from a terminal C, a function to determine on applying current to windings $L_1$–$L_4$ in what sequence for excitation and a function to produce from terminal B a pulse driving a relay 4 being a switching element. $L_1$–$L_4$ represent windings of a pulse motor. And the pulse motor mentioned herein is a 4-phase pulse motor. Accordingly, as the 1-phase excitation method is applied to the 4-phase pulse motor, the windings $L_1$–$L_4$ are excited individually. In addition, windings $L_1$ and $L_2$, and $L_3$ and $L_4$ are composed to produce electromotive forces with electrical polarity contrary to each other through vibration or rotation of a rotor of a pulse motor. As an example, windings $L_1$ and $L_2$, and similarly $L_3$ and $L_4$ are each wound on separate poles, in the conventional manner known for pulse motors as shown in FIG. 7.

Windings $L_1$ and $L_2$ may take the form of a single coil having a center tap which is coupled to current source 2. It should be noted, however, that due to the action of transistors $TR_1$ and $TR_2$, windings $L_1$ and $L_2$ are never simultaneously energized.

In like manner, windings $L_3$ and $L_4$ are also wound on a common magnetic pole and may also be constructed from a center tapped common coil, in which the center tap is coupled to current source 2. Once again coils $L_3$ and $L_4$ are never simultaneously energized.

Figure 7:
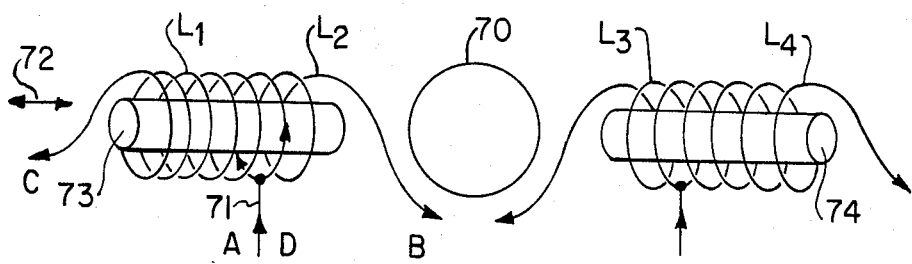
FIG. 7 shows the manner in which windings $L_1$, $L_2$ and $L_3$, $L_4$ of FIG. 2 are wound on separate polar 73 and 74 respectively.

This structure is shown in FIG. 7 in which windings $L_1$ and $L_2$ are wound on a single pole 73. The direction of $L_1$ and $L_2$ are considered to be in opposite directions since a center tap 71, also referred to as A,D is considered as a starting point for each winding. Center tap 71 is coupled to current source 2. The resulting magnetic field generated by the current in windings $L_1$ and $L_2$ is in the direction of arrows 72.

Windings $L_3$ and $L_4$ are similarly wound on pole 74 and the two pairs of windings are disposed across rotor 70. It will be understood by those skilled in the art that the pole pairs $L_1$, $L_2$ and $L_3$, $L_4$ need not have their axes disposed 180° apart from one another as shown in FIG.

7, but their axes rather may be displaced at an angle other than 180° with respect to one another depending upon the number of poles utilized in the motor.

Although FIGS. 2 and 7 show a single pair of poles $L_1$ and $L_2$ and $L_3$ and $L_4$, any number of such pole pairs may be utilized, as in a conventional step motor. For example, many common step motors utilize 8 such poles and consequently in such a motor, a combination of coils $L_1$, $L_2$ and $L_3$, $L_4$ would have their axes disposed 45° with respect to one another.

$TR_1$-$TR_4$ are transistors which interrupt current to windings $L_1$-$L_4$, respectively. 2 represents a current source and 3 represents a hammer driving section. Accordingly, when the pulse motor is turned to some degree in the clockwise direction by a control circuit 1, ON/OFF operation of the transistors $TR_1$-$TR_4$ is controlled within the control circuit 1 through the constant sequence to excite the windings $L_1$-$L_4$. While, when the pulse motor is turned to some degree in the counterclockwise direction, a similar operation is employed.

$C_1$ and $C_2$ represent capacitors, $SW_1$ and $SW_2$ and the relay 4 compose a switching element. The capacitors $C_1$, $C_2$ and the switching element are stood in series between the windings $L_1$ and $L_2$, and $L_3$ and $L_4$, respectively. In addition, the switching points $SW_1$ and $SW_2$ have been released at first. The composition has been made as mentioned above and therefore the following action is made. For the explanation of this action, reference is made to the timing chart of FIG. 3. For example, the control circuit 1 sends the necessary number of pulse motor driving pulses (A) for printing. In addition, ON/OFF sequence of the transistors $TR_1$-$TR_4$ is prepared within the control circuit 1 based on the necessary number of pulse motor driving pulses (A) to execute the sequence. Accordingly, after the pulse motor driving pulses (A) have been sent out, the pulse motor turns by the constant angle to the constant direction. At this time, in synchronization with starting up of the final pulse of the pulse motor driving pulses (A), a relay driving signal (B) is sent to a relay 4 from the control circuit 1. By this, the relay 4 turns over the switching points $SW_1$ and $SW_2$. Accordingly, the closed loop of winding $L_1$—capacitor $C_1$—winding $L_2$ and the closed loop of winding $L_3$—capacitor $C_2$—winding $L_4$ are formed.

As a result, the electromotive force that generates in the winding $L_1$ is same in power as the electromotive force that generates in the winding $L_2$, but is contrary in polarity to that and therefore both electromotive forces neutralize each other through the capacitor $C_1$.

Furthermore, for the windings $L_3$ and $L_4$, the electromotive forces that generated in the same manner neutralize each other. After that, the control circuit 1 sends a hammer driving pulse (C) to a hammer driving section 3 for printing. At the time of printing, since the electromotive forces neutralize each other between the windings $L_1$ and $L_2$, and $L_3$ and $L_4$, neither vibration nor rotation of the rotor takes place. Consequently, printing is completed clearly.

As explained above, according to this invention since no capacitor is placed at the time of rotation of a pulse motor, a high-speed operation can be made. In addition, since a capacitor is placed at the time of stop of the pulse motor to neutralize the electromotive forces that will generate, a highly efficient damper can be provided and the vibration and rotation of the rotor can be stopped immediately. Moreover, with a 1-phase excitation method used, the accuracy of the angle of the pulse motor is not reduced and therefore the invention is suitable for a typewriter.

Then, a method of determining the best-suited value of the capacitor is stated as follows:

The frequency and the phase of the electromotive forces to be excited in the coil of a stator through the vibration of the rotor are not necessarily consistent with those of the vibration of the rotor. For this reason, the intensity of magnetic flux passing through the coil of the stator has a non-linear function with the position of the rotor. Furthermore, this function varies depending on the structural type of the pulse motor. This is expressed in a formula determining B as a magnetic flux density and the displacement angle of the rotor as $\theta$.

$$B = F(\theta)$$

In this formula, $\theta$ can be expressed below by determining amplitude of vibration of the rotor as $\Theta$, the angular velocity as $\omega$ and the phase as $\phi$.

$$\theta = \Theta \sin(\omega t + \phi)$$

Then, the electromotive force to be excited is proportional to change in the magnetic flux and accordingly an expression is made in a formula.

$$e = k \frac{dB}{dt} = k \frac{dF(\theta)}{dt}$$

To obtain damping effects, current i flowed by this electromotive force must have relationship in the phase with the angular velocity of the rotor so as to become a brake. That is, $$i = K \cdot \frac{1}{Z} \cdot \frac{dF(\theta)}{dt}$$

Where, Z is an impedance of the closed loop circuit to be formed by a capacitor and two coils.

$$Z = R + j\omega L + \frac{1}{j\omega C} = R + j\left(\omega L - \frac{1}{\omega C}\right)$$

$$|Z| = \sqrt{R^2 + \frac{(\omega^2 LC - 1)^2}{\omega^2 C^2}}$$

Accordingly, the value of C consisting of Z must be properly selected by $F(\theta)$. That is, when the relationship between $\omega$ and LC is specified in the above formula to obtain $\omega^2 LC - 1 = 0$, $|Z| = R$ is calculated and $|Z|$ becomes minimum. For this, the electrical series resonance frequency to be determined by LC is made consistent with the mechanical vibration frequency of the rotor. Then a noteworthy factor is the inductance L of the coil. As known well as a property of pulse motor, the inductance of coil of winding varies depending on the position of the rotor. Moreover, considering the inductance of the coil in the mechanical resonance frequency of the rotor, change in the magnetic flux takes place due to the mechanical vibration of the rotor and consequently, as induced voltage generates in the coil the apparent inductance of coil becomes larger than the inductance of coil itself. The degree of becoming large varies depending on the model and the shape of the pulse motor to be used. In the pulse motor for driving a daisy wheel type plate being an embodiment of this invention, the apparent inductance acts as almost double of inductance of the coil. For this embodiment, procedures for calculating proper capacitor value are explained.

The nominal inductance of coil per winding is decided as L' and the mechanical vibration frequency of rotor as $f_M$. When the electrical resonance frequency is calculated, since the inductance of coil becomes 2 times as stated above and further L=4L' is obtainable by allowing two coils to be connected in series, a formula for calculating the electrical resonance frequency $f_E$ is shown as follows:

$$f_E = \frac{1}{2\pi \sqrt{4 \times L'C}}$$

In this formula, when $f_E=f_M$ is obtainable, the maximum damping effect is exhibited. Accordingly, the following formula is obtained.

$$\frac{1}{2\pi \sqrt{4 \times L'C}} = f_M$$

According to this, the following formula is expressed to calculate C.

$$C = \frac{1}{(4\pi f_M)^2 \times L'}$$

When the concrete numerical value is substituted in conformity with the embodiment, the followings are obtained.

$f_M = 67$ Hz
$L' = 14$ mH
$\therefore C \approx 100$ μF

Then, in other words, by deciding as $f_0$ the resonance frequency calculated from the nominal inductance value L' of coil and the capacitor, the following formula is expressed.

$$f_0 = \frac{1}{2\pi \sqrt{2L' \times C}} = \frac{1}{2\pi \sqrt{4L' \times C}} \times \sqrt{2}$$

From this, the relationship in $\sqrt{2} \times f_E = f_0 = \sqrt{2} \times f_M$ is introduced. That is, apparently it is preferable to determine C so that the electrical series resonance frequency $f_0$ calculated from the nominal inductance of the coil becomes $\sqrt{2}$ time the mechanical resonance frequency $f_M$.

Figure 4:
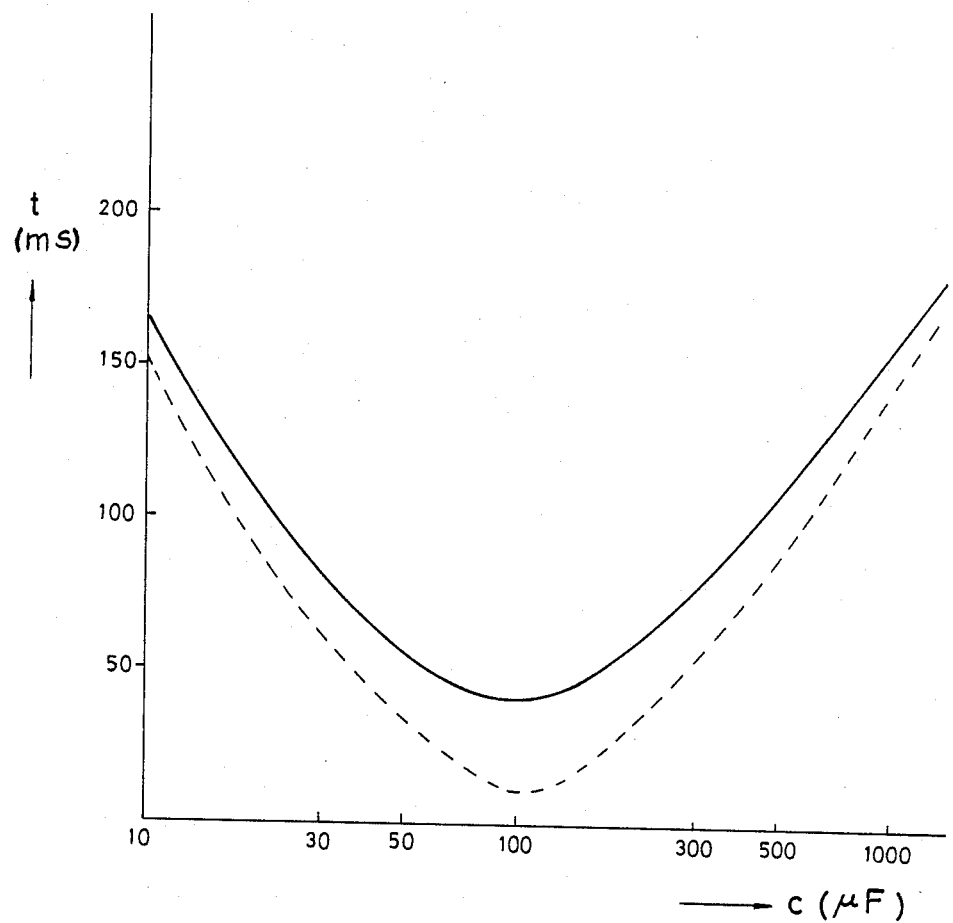
FIG. 4 is a graph showing the relationship between the capacity value of a capacitor connected to a pair of windings of the pulse motor and consisting of a series resonance circuit and a time spent until the vibration of the pulse motor stops.

The results of time measured until the pulse motor stops vibration after the capacity of the capacitor has been changed are shown in FIG. 4. As shown from the solid line in FIG. 4, when the capacity of the capacitor is within 50 μF–200 μF, that is, when the series resonance frequency of the series resonance circuit formed by the nominal inductance of two windings and capacitor is within $\sqrt{2}$ time (50 μF when indicated in the capacity value of the capacitor to be included in the resonance circuit of the embodiment) to $1/\sqrt{2}$ time (similarly 200 μF) centering $\sqrt{2}$ time (similarly 100 μF) the vibration frequency of the pulse motor including a mechanical system, a typewriter can be used practically. Namely, the capacity of the capacitor is within ½ (50 μF) to 2 times (200 μF) centering 100 μF. It is, however, obvious to be able to broaden the range of capacity according to the purpose of using a device.

By the way, when the absolute value of the impedance Z of the closed loop to be formed by the capacitor and two coils is small, it is mentioned above that the damping effect becomes greater in theory. Then as a method of minimizing impedance Z, reducing direct current resistance existing in the closed loop circuit is applied. By doing it, the objective is to further improve the effect of instantaneous stop in the invention.

Figure 5:
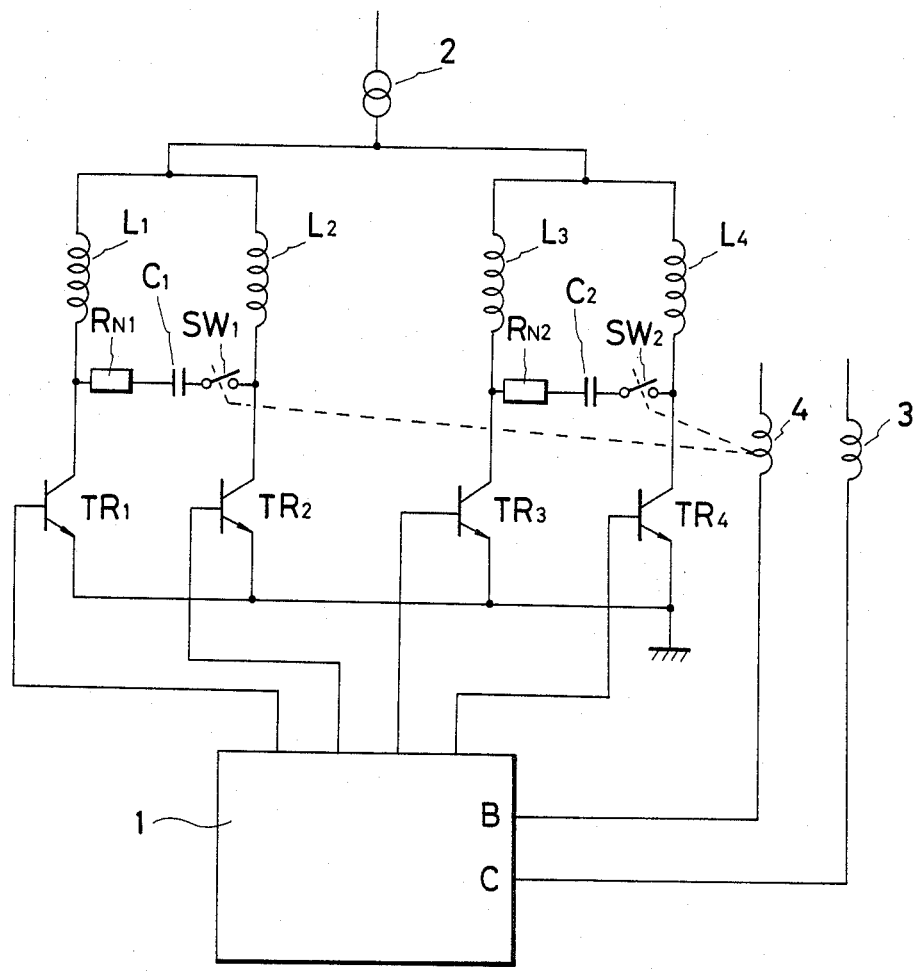
FIG. 5 is a circuit diagram showing the other embodiment of the invention where negative resistance was applied in series with the capacitor.

FIG. 5 shows an embodiment of the invention, where the same symbols as those of FIG. 2 represent the same component elements. Accordingly, in this example, it is characterized that negative resistance $R_{N1}$ and $R_{N2}$ are coupled between the switching elements $SW_1$, $SW_2$ and coils $L_1$, $L_2$. In concrete terms, an example of circuit giving these negative resistance $R_{N1}$ and $R_{N2}$ is shown in FIG. 6.

Figure 6:
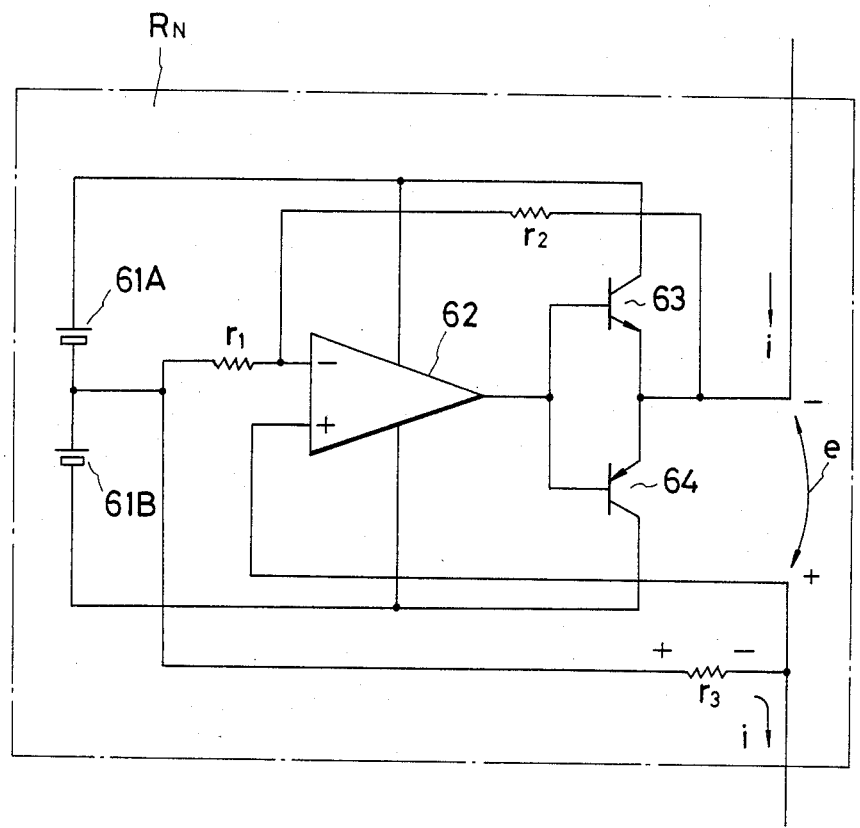
FIG. 6 is a circuit diagram showing an example of the negative resistance used in the embodiment of FIG. 5.

In FIGS. 6, 61A, 61B are power sources resistances, $r_1$, $r_2$, $r_3$, an operational amplifier 62 and transistors 63,64. This circuit is so-called non-reversal circuit and transistors 63, 64 are connected to increase output current. Accordingly, in the circuit the following formula is neutralized.

$$-e = \left(1 + \frac{r_2}{r_1}\right)(r_2 \cdot i)$$

$$e = -\left(1 + \frac{r_2}{r_1}\right) r_3 \cdot i$$

$$\therefore R_N = -\left(1 + \frac{r_2}{r_1}\right) r_3$$

Thus, negative resistance is produced.

By coupling the abovementioned negative resistance $R_N$, the current flowing in the closed loop increases and thereby the damping effect becomes greater.

In the pulse motor used by the inventors, direct current resistance is 50Ω per winding and 10Ω in the entire closed loop. Accordingly, it is decided that the negative resistance $R_N$ is 9Ω. According to this, as shown by the dotted line in FIG. 4, it was confirmed that the negative resistance is in such shape that the original graph was moved downward in parallel. And when the capacitor of 100 μF was used, vibration stopped at 15 mS.

Then, the reason why the negative resistance is not made same as direct current value in the closed loop is that the time of convergence into the turning angle of the rotor without vibration may lengthen due to overdamping. In addition, it is obvious that the rotor vibrates when the absolute value of the negative resistance exceeds the direct current resistance value.

Figure 3:
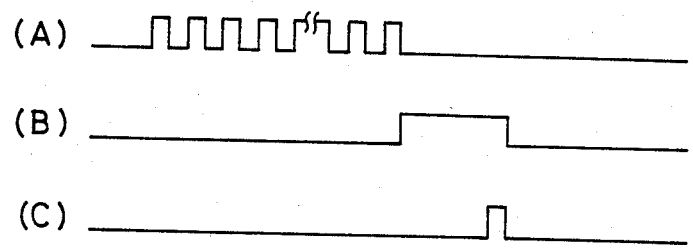
FIG. 3 is a timing chart to explain the operation of the circuit shown in FIG. 2.

As stated above, according to the invention, by taking about 50 mS when no negative resistance is stood in the pulse width of the relay driving signal (B) shown in FIG. 3 and by taking about 15 mS when the negative resistance is stood, the time of vibration can be controlled by 1/20 and 1/60, respectively in comparison with 1-sec vibration in the past.

Moreover, in the explanation about the invention, a 4-phase pulse motor is used through the 1-phase excitation method, but this method is applicable to pulse motors other than the 4-phase pulse motor. That is, n-phase pulse motor can be used through the 1-phase excitation method. In addition, a transistor and SCR are used as switching elements and any element capable of controlling switching operations in the control circuit and connecting or disconnecting a capacitor between windings generating an electromotive force with inverse polarity may be used as a switching element.

As stated above, in the invention when a pulse motor is used in the device requiring high-speed movement and high-speed stop, a damper effect takes place in a capacitor and a switching element and when the negative resistance is applied, the damper effect becomes greater. Accordingly, according to the invention the optimum pulse motor damper can be provided.

What is claimed is:

1. An electronic damper for a single phase excitation type pulse motor having a natural resonance frequency, including pairs of opposed windings for generating electromotive forces of opposite polarity due to movement of said rotor, comprising capacitor and switch means coupled in series between said pairs of opposed windings, for completing, after termination of an output pulse to said pulse motor, a series resonant circuit comprised of said capacitor and said pairs of windings, wherein said series resonant circuit resonant frequency is selected from the range of one-half to twice said motor resonance frequency.

2. The electronic damper according to claim 1 wherein said series resonant circuit resonant frequency substantially equals said motor resonant frequency.

3. The electronic damper according to claim 2 wherein said series resonant circuit resonant frequency is determined according to an inductance comprised of a nominal inductance of said windings together with an inductance increase from mechanical vibration of said windings.

4. An electronic damper for a single phase excitation type pulse motor having a natural resonance frequency, including pairs of opposed windings having a d.c. resistance, said windings generating electromotive forces of opposite polarity due to movement of said rotor comprising:

a series circuit in series with said pairs of winding including a capacitor, negative resistance means for neutralizing said winding d.c. resistance, and switch means for coupling after termination of an output pulse to said pulse motor, said series circuit to said windings.

5. The electronic damper according to claim 4 wherein said capacitor and said windings comprise a series resonant circuit, the resonant frequency of which is selected to be in the range of one-half to twice said motor resonance frequency.

6. The electronic damper according to claim 5 wherein said series resonant circuit resonant frequency substantially equals said motor resonant frequency.

7. The electronic damper according to claim 6 wherein said series resonant frequency is determined according to an inductance comprised of a nominal inductance of said windings together with an inductance increase from mechanical vibration of said windings.

* * * * *